(12) United States Patent
Kelly

(10) Patent No.: US 11,032,152 B2
(45) Date of Patent: Jun. 8, 2021

(54) MACHINE-LEARNING BASED SELF-POPULATING DASHBOARD FOR RESOURCE UTILIZATION MONITORING IN HYPER-CONVERGED INFORMATION TECHNOLOGY ENVIRONMENTS

(71) Applicant: Dell Products L.P., Hopkinton, MA (US)

(72) Inventor: John Kelly, Mallow Cork (IE)

(73) Assignee: Dell Products L.P., Hopkinton, MA (US)

( * ) Notice: Subject to any disclaimer, the term of this patent is extended or adjusted under 35 U.S.C. 154(b) by 624 days.

(21) Appl. No.: 15/962,244

(22) Filed: Apr. 25, 2018

(65) Prior Publication Data

US 2019/0334787 A1    Oct. 31, 2019

(51) Int. Cl.
| | |
|---|---|
| *G06F 3/048* | (2013.01) |
| *H04L 12/24* | (2006.01) |
| *H04L 12/911* | (2013.01) |
| *G06T 11/20* | (2006.01) |
| *G06F 3/0484* | (2013.01) |
| *G06N 20/00* | (2019.01) |

(52) U.S. Cl.
CPC .......... *H04L 41/22* (2013.01); *G06F 3/04847* (2013.01); *G06N 20/00* (2019.01); *G06T 11/203* (2013.01); *H04L 47/82* (2013.01)

(58) Field of Classification Search
None
See application file for complete search history.

(56) References Cited

U.S. PATENT DOCUMENTS

| | | |
|---|---|---|
| 7,281,170 B2 | 10/2007 | Taylor et al. |
| 8,140,898 B2 | 3/2012 | Beg et al. |
| 9,665,420 B2 | 5/2017 | Jilani |
| 9,753,801 B2 | 9/2017 | Ishii et al. |
| 2003/0065986 A1* | 4/2003 | Fraenkel ............. G06F 11/3089 714/47.2 |
| 2009/0055684 A1 | 2/2009 | Jamjoom et al. |
| 2017/0228277 A1 | 8/2017 | Cheng et al. |
| 2017/0308424 A1 | 10/2017 | Gossler |

\* cited by examiner

*Primary Examiner* — William C Trapanese
(74) *Attorney, Agent, or Firm* — Chamberlain, Hrdlicka, White, Williams & Aughtry

(57) ABSTRACT

A machine-learning based self-populating dashboard for resource utilization monitoring in hyper-converged information technology (IT) environments. Specifically, the method and system disclosed herein entail the continuous monitoring of select resource utilization parameters across various nodes in an environment. Cause and effect relationships between these select resource utilization parameters and other utilization parameters are periodically assessed to dynamically populate a user interface (e.g., a web-based or non-web-based dashboard). The user interface provides environment administrators with a tool that intelligently identifies which resource utilization parameters may be strong contenders as root causes of user issues and/or failures occurring in the environment.

20 Claims, 12 Drawing Sheets

Example Hyper-Converged Infrastructure (HCI) Environment Dashboard 720

Example Resource Utilization Monitoring (RUM) Request View 722

Target Resource Utilization Parameters (RUPs) 724

| | | | |
|---|---|---|---|
| ☐ RUP A | ☐ RUP G | | |
| ☒ RUP B | ☐ RUP H | | |
| ☐ RUP C | ☐ RUP I | | |
| ☐ RUP D | ☒ RUP J | | |
| ☒ RUP E | ☐ RUP K | | |
| ☒ RUP F | ☐ RUP L | | |

Parameter Alarm Conditions (PACs) 726

| RUP B | PAC Set B |
| RUP E | PAC Set E |
| RUP F | PAC Set F |
| RUP J | PAC Set J |

Clear Button 728

Submit Button 730

*FIG. 7B*

MACHINE-LEARNING BASED SELF-POPULATING DASHBOARD FOR RESOURCE UTILIZATION MONITORING IN HYPER-CONVERGED INFORMATION TECHNOLOGY ENVIRONMENTS

BACKGROUND

A critical element of hyper-converged infrastructure (HCI) environments pertains to their management and orchestration (M&O). Within this M&O domain, the subdomain of resource utilization monitoring is of great significance towards determining the root cause of user issues and/or failures.

Other aspects of the invention will be apparent from the following description and the appended claims.

BRIEF DESCRIPTION OF DRAWINGS

FIG. 7B shows an example resource utilization monitoring request view of an example hyper-converged infrastructure environment dashboard in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7E, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a machine-learning based self-populating dashboard for resource utilization monitoring in hyper-converged information technology (IT) environments. Specifically, one or more embodiments of the invention entail the continuous monitoring of select resource utilization parameters across various nodes in an environment. Cause and effect relationships between these select resource utilization parameters and other utilization parameters are periodically assessed to dynamically populate a user interface (e.g., web-based or non-web-based dashboard). The user interface may provide environment administrators with a tool that intelligently identifies which resource utilization parameters may be strong contenders as root causes of user issues and/or failures occurring in the environment.

Figure 1:
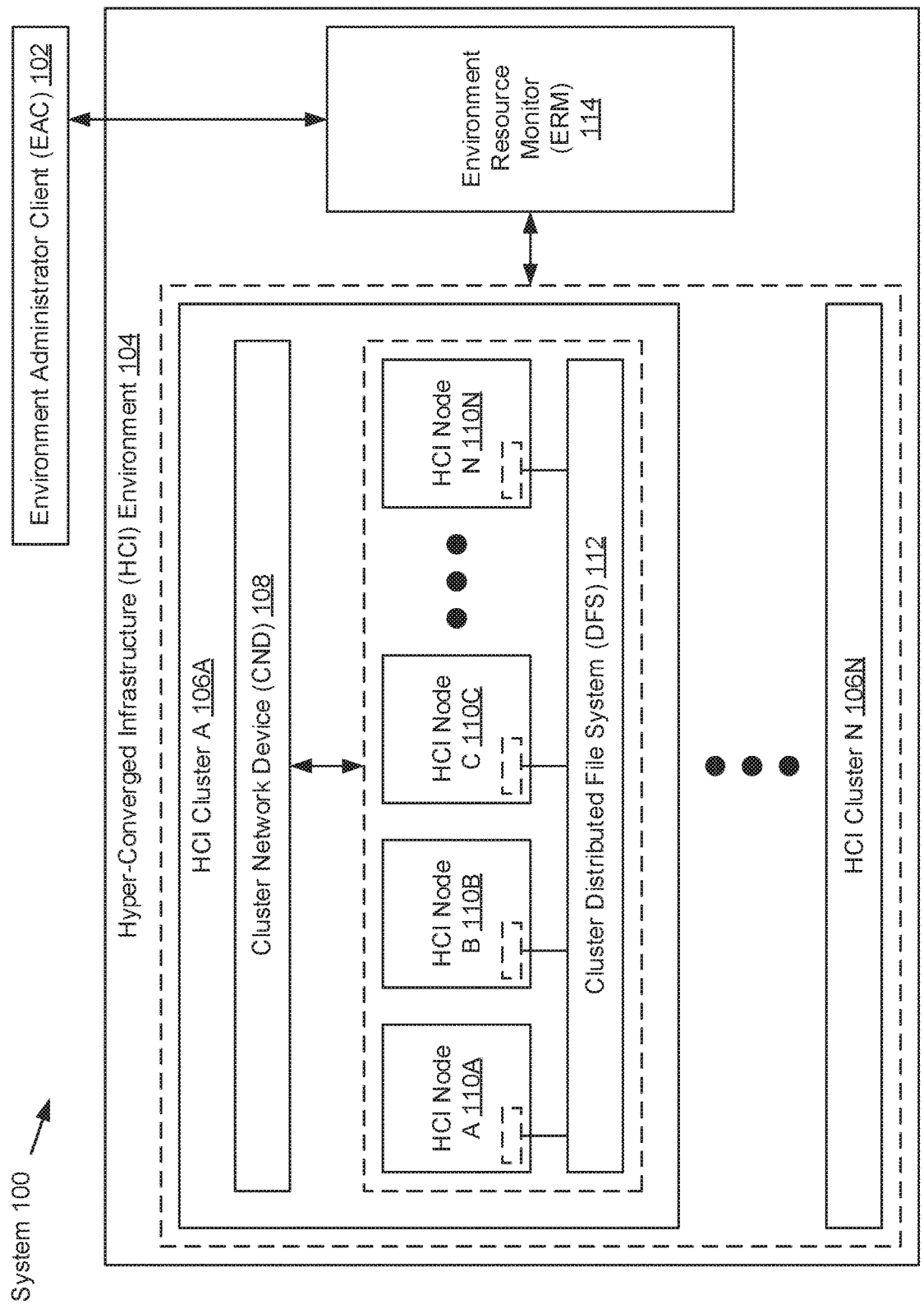
FIG. 1 shows a system in accordance with one or more embodiments of the invention.

FIG. 1 shows a system in accordance with one or more embodiments of the invention. The system (100) may include an environment administrator client (EAC) (102) operatively connected to a hyper-converged infrastructure (HCI) environment (104). Each of these components is described below.

In one embodiment of the invention, the EAC (102) and the HCI environment (104) may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the EAC (102) and the HCI environment (104) are indirectly connected, there may be other networking components or systems (e.g., switches, routers, gateways, etc.) that facilitate communications and/or information exchange. Further, the EAC (102) and the HCI environment (104) may communicate with one another using any combination of wired and/or wireless communication protocols.

In one embodiment of the invention, the EAC (102) may be any computing system (see e.g., FIG. 6) operated by an administrator of the HCI environment (104). An administrator of the HCI environment (104) may be an individual (or a group of individuals) who may be responsible for overseeing operations and maintenance pertinent to the hardware, software, and/or firmware elements of the HCI environment (104). Further, the EAC (102) may include functionality to interact with the HCI environment (104) through the submission of web application programming interface (API) requests and the receiving of corresponding web API responses. In one embodiment of the invention, the requests may pertain to resource utilization monitoring (described below). Moreover, the responses may, for example, take form as processed data and/or visualizations (e.g., graphs, charts, tables, etc.) presented on a user interface (e.g., a web-based or non-web-based dashboard), which address the requests. One of ordinary skill will appreciate that the EAC (102) may perform other functionalities without departing from the scope of the invention. Examples of the EAC (102) include, but are not limited to, a desktop computer, a laptop computer, a tablet computer, a server, a mainframe, a smartphone, or any other computing system similar to the exemplary computing system shown in FIG. 6.

In one embodiment of the invention, the HCI environment (104) may refer to datacenter and/or cloud computing infrastructure (i.e., a configuration of various information technology (IT) components (e.g., servers, storage, networking, management, etc.)) that reflects hyper-convergent architecture. Hyper-convergent architecture may entail the software-centric or software-defined integration of virtualization, compute, storage, and networking resources into a single solution. The solution may take form as a software stack, a hardware appliance, or a combination thereof. Further, the HCI environment (104) may be implemented using one or more HCI clusters (106A-106N) operatively connected to one another and an environment resource monitor (ERM) (114). Each of these components is described below.

In one embodiment of the invention, a HCI cluster (106A-106N) may refer to a group of linked HCI nodes (110A-110N), which may be configured to share resources. The shared resources may include at least compute, storage, and/or network resources (further described below). Further, the sharing of any resource may entail virtualizing the resource in each HCI node (110A-110N) to create a logical pool of that resource, which, subsequently, may be provisioned, as needed, across all HCI nodes (110A-110N) in the HCI cluster (106A-106N). For example, when considering storage resources, the physical device(s) (e.g., hard disk drives (HDDs), solid state drives (SSDs), etc.) representative of the local storage resources on each HCI node (110A-110N) may be virtualized to form a globally-accessible cluster distributed file system (DFS) (112). The cluster DFS (112) may thus be a logical pool of disk capacity formed from all storage resources across a HCI cluster (106A-106N).

In one embodiment of the invention, each HCI cluster (106A-106N) may entail a group of linked HCI nodes (110A-110N) that collectively work towards servicing a specific usage scenario. Often, a HCI cluster (106A-106N) may encompass at least two or three HCI nodes (110A-110N) to sustain high availability and/or redundancy. In one embodiment of the invention, a HCI node (110A-110N) may refer to a physical appliance—e.g., a server (not shown) or any computing system similar to the exemplary computing system shown in FIG. 6. Further, each HCI node (110A-110N) in a HCI cluster (106A-106N) may manage a set of tasks that implement at least a portion of the specific usage scenario that which the HCI cluster (106A-106N) may be servicing. HCI nodes (110A-110N) are described in further detail below with respect to FIG. 3.

In one embodiment of the invention, a HCI cluster (106A-106N) may further include a cluster network device (CND) (108). The CND (108) may be a physical device that includes functionality to facilitate communications and/or information exchange amongst the various HCI nodes (110A-110N) of a HCI cluster (106A-106N). The CND (108) may include further functionality to enable communications and/or information exchange between the various HCI nodes (110A-110N) of a HCI cluster (106A-106N) and (a) other HCI clusters (106A-106N) in the HCI environment (104); (b) the ERM (114); and/or (c) one or more external entities (e.g., the EAC (102)). Examples of the CND (108) include, but are not limited to, a network switch, a network router, a network gateway, a network bridge, or any combination thereof.

In one embodiment of the invention, the ERM (114) may be a resource utilization monitoring (RUM) service available to, or a RUM feature available on, the HCI environment (104). The ERM (114) may be implemented using one or more servers (not shown). Each server may be a physical server (i.e., in a datacenter), a virtual server (i.e., that may be cloud-based), or a combination thereof. In another embodiment of the invention, the ERM (114) may be implemented on one or more computing systems similar to the exemplary computing system shown in FIG. 6. The ERM (114) may be operatively connected to all HCI nodes (110A-110N) across all HCI clusters (106A-106N) in the HCI environment (104), as well as the EAC (102). Furthermore, the ERM (114) may include functionality to, in accordance with one or more embodiments of the invention (see e.g., FIGS. 4-5B): monitor resource utilization parameters (RUPs) (described below) throughout the HCI environment (104); identify causal relationships between the RUPs; and dynamically provide (e.g., via a web-based or non-web-based dashboard) relevant data and/or visualizations, to administrators of the HCI environment (104), based on identified causal relationships most pertinent to one or more parameter alarm conditions (PACs) (described below). The ERM (114) is described in further detail below with respect to FIG. 2.

While FIG. 1 shows a configuration of components, other system configurations may be used without departing from the scope of the invention.

Figure 2:
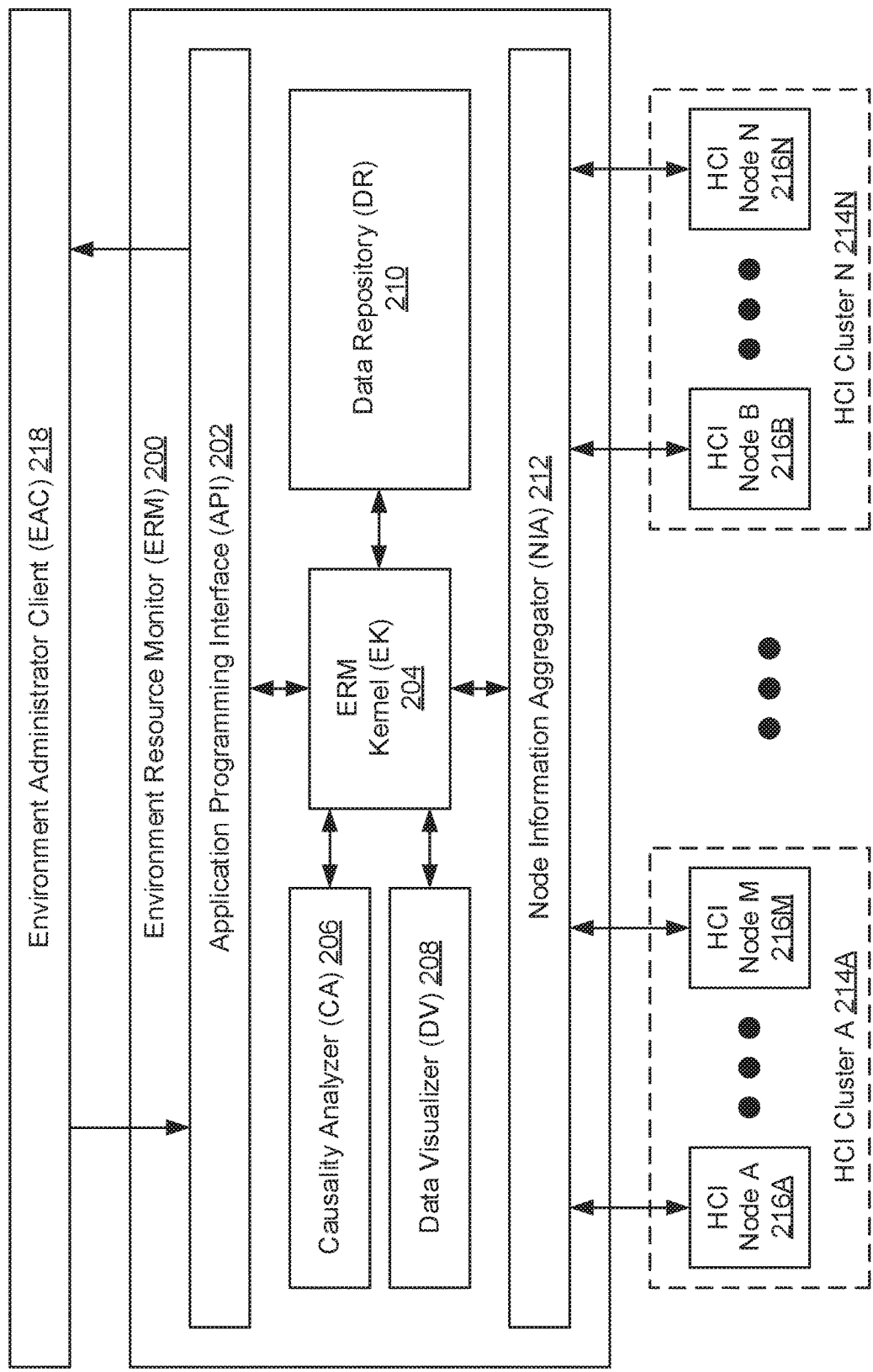
FIG. 2 shows an environment resource monitor in accordance with one or more embodiments of the invention.

FIG. 2 shows an environment resource monitor (ERM) in accordance with one or more embodiments of the invention. The ERM (200) may include an application programming interface (API) (202), an ERM kernel (EK) (204), a causality analyzer (CA) (206), a data visualizer (DV) (208), a data repository (DR) (210), and a node information aggregator (NIA) (212). Each of these components is described below.

In one embodiment of the invention, the API (202) may be a hardware and/or software implemented construct that employs a set of subroutine definitions, protocols, and/or tools for enabling communications and/or information exchange between the ERM (200) and other entities such as, for example, an environment administrator client (EAC) (218) (described above). The API (202) may include functionality to: receive API requests from the EAC (218); process API requests to obtain request-pertinent arguments therefrom; provide the obtained request-pertinent arguments to the EK (204); obtain request-pertinent results from the EK (204); encode the obtained request-pertinent results to construct API responses; and provide API responses to the EAC (218). One of ordinary skill will appreciate that the API (202) may perform other functionalities without departing from the scope of the invention. Further, by way of an example, the API (202) may be a web API that may be accessed through an assigned web address (e.g., a uniform resource locator (URL)) and a WAN (e.g., Internet) connection.

In one embodiment of the invention, the EK (204) may be a computer program or process (i.e., an instance of a computer program) that executes on the underlying hardware of the ERM (200). Specifically, the EK (204) may be a computer program/process tasked with overseeing and coordinating communications between and operations performed by the various other components (i.e., the API (202), the CA (206), the DV (208), the DR (210), and the NIA (212)) of the ERM (200). In one embodiment of the invention, the EK (204) may perform the role fulfilled by a microkernel and/or monolithic kernel in operating systems (OSs). The EK (204) may include further functionality to: obtain request-pertinent arguments (e.g., parameter-condition tuples (PCTs)) (described below) from the API (202); identify hyper-converged infrastructure (HCI) nodes (216A-216M, 216B-216N) relevant to the obtained request-pertinent arguments; request for and, based on the request, obtain aggregated parameter data from the NIA (212); request for, and based on the request, obtain visualizations of the aggregated parameter data from the DV (208); request for, and based on the request, obtain causal relationships between resource utilization parameters from the CA (206); access the DR (210) to store or retrieve any information pertinent to embodiments of the invention; and aggregate and, subsequently, provide request-pertinent results, which may be based at least on the aggregated parameter data, the causal relationships, and visualizations, to the API (202). One of ordinary skill will appreciate that the EK (204) may perform other functionalities without departing from the scope of the invention.

In one embodiment of the invention, the CA (206) may be a computer program or process (i.e., an instance of a computer program) that executes on the underlying hardware of the ERM (200). Specifically, the CA (206) may be a computer program/process tasked with determining causal relationships between the various resource utilization parameters observed across one or more HCI nodes (216-216M, 216B-216N). Further, to determine the causal relationships, the CA (206) may employ or execute one or more causality and/or correlation algorithms. In one embodiment of the invention, the CA (206) may include additional functionality to: receive requests from the EK (204) directed to measuring causality and/or correlation between resource utilization parameters; and, subsequently, provide the causality and/or correlation results to the EK (204) in response to the requests.

In one embodiment of the invention, a causality algorithm may refer to a procedure or process directed to measuring causal relations between variables (e.g., two or more resource utilization parameters). In the simplest case, a causal relation between two variables exists if the presence of (or an action induced by) the first variable affects the presence of (or an action induced by) the second variable. Further, in one embodiment of the invention, a correlation algorithm may refer to procedure or process directed to measuring whether there exists, and the strength of, relationships, causal or not, between variables (e.g., two or more resource utilization parameters). Examples of causality and/or correlation algorithms employed by the CA (206) include, but are not limited to, the Pearson correlation algorithm, the Granger causality algorithm, the Kendall correlation algorithm, and the Spearman correlation algorithm.

In one embodiment of the invention, the DV (208) may be a computer program or process (i.e., an instance of a computer program) that executes on the underlying hardware of the ERM (200). Specifically, the DV (208) may be a computer program/process tasked with visualizing aggregated data pertaining to one or more resource utilization parameters. Thus, the DV (208) may include functionality to: receive requests from the EK (204) directed to generating graphical representations (e.g., line graphs or scatter plots) of aggregated data for one or more resource utilization parameters; and, subsequently, provide the graphical representations to the EK (204) in response to the requests.

In one embodiment of the invention, the DR (210) may be a logical container for storing and managing various forms of data. The DR (210) may be implemented using any type of storage unit and/or device (e.g., a filesystem, a database, a collection of tables, or any other storage mechanism). Further, the DR (210) may be implemented using multiple storage units and/or devices, which may or may not be of the same type. In one embodiment of the invention, the DR (210) may be implemented using persistent (i.e., non-volatile) storage media such as, for example, optical storage, magnetic storage, NAND Flash Memory, NOR Flash Memory, Magnetic Random Access Memory (M-RAM), Spin Torque RAM (ST-RAM), Phase Change Memory (PCM), or any other memory defined as a non-volatile Storage Class Memory (SCM). Moreover, any information stored in the DR (210) may be maintained (i.e., added, removed, and/or updated) by the EK (204). Examples of information that may be consolidated in the DR (210) include, but are not limited to: aggregated (i.e., historical and present) data pertaining to one or more resource utilization parameters observed/measured on one or more HCI nodes (216A-216M, 216B-216N); historical (i.e., previous/past) request-pertinent results and/or analyses demonstrating causal and/or correlation relationships between two or more resource utilization parameters; known (i.e., empirically verified) causal and/or correlation mappings between two or more resource utilization parameters; and preset configuration and operational settings for the various components of the ERM (200).

In one embodiment of the invention, the NIA (212) may be a computer program or process (i.e., an instance of a computer program) that executes on the underlying hardware of the ERM (200). Specifically, the NIA (212) may be a computer program/process tasked with aggregating resource utilization parameter data from one or more HCI nodes (216A-216M, 216B-216N). In one embodiment of the invention, the aforementioned aggregated data may be obtained through periodic polling or pulling (i.e., through the submission of periodic requests to, and the reception of responses from, the HCI node(s) (216A-216M, 216B-216N)). In another embodiment of the invention, the aforementioned aggregated data may be obtained through periodic pushing (i.e., the periodic reception of data without prompting or the submission of requests) of the data from the HCI node(s) (216A-216M, 216B-216N). The NIA (212) may include further functionality to consolidate any aggregated data on the DR (210) via the EK (204).

Figure 3:
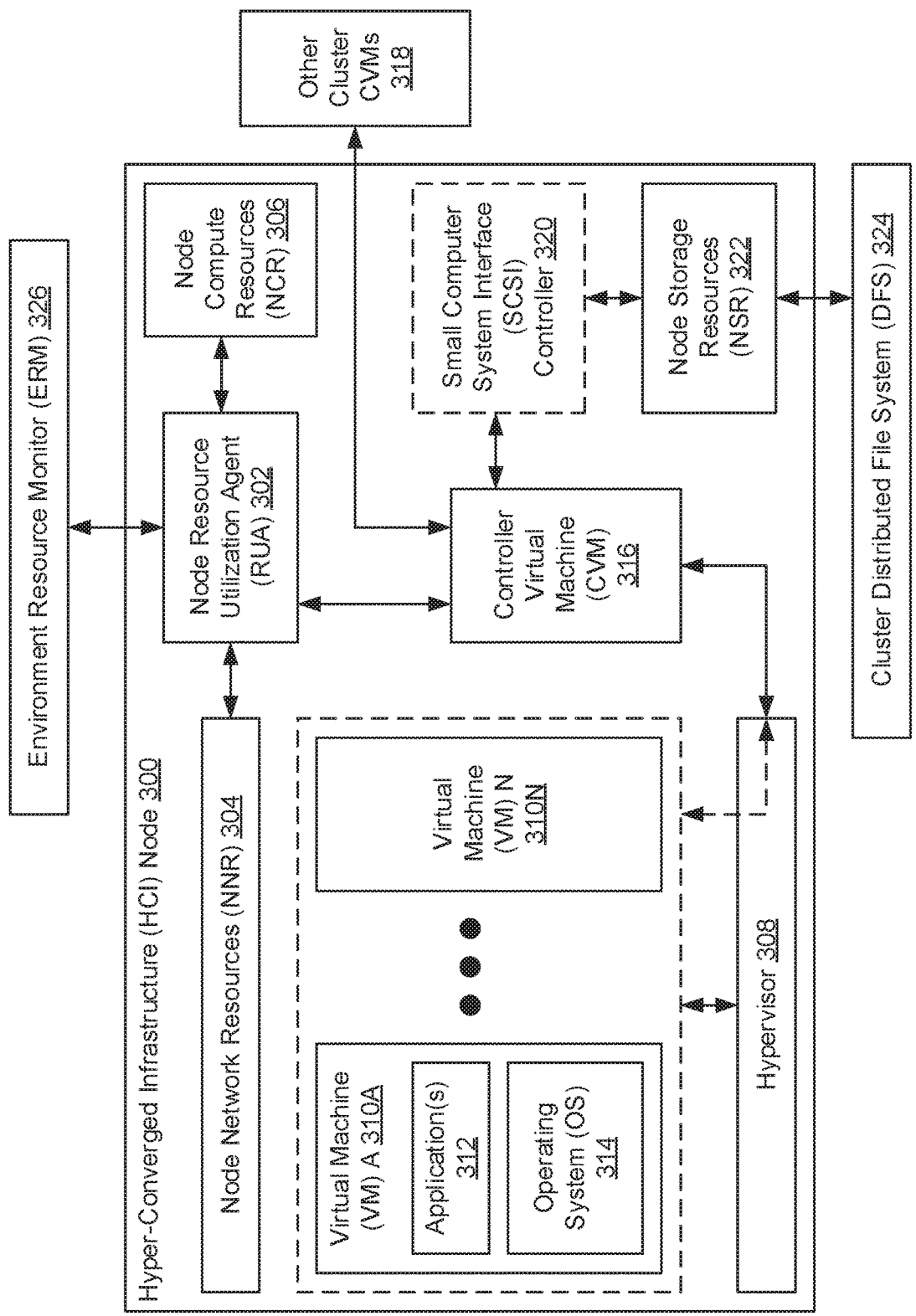
FIG. 3 shows a hyper-converged infrastructure node in accordance with one or more embodiments of the invention.

FIG. 3 shows a hyper-converged infrastructure (HCI) node in accordance with one or more embodiments of the invention. As describe above, a HCI node (300) may refer to a physical appliance—e.g., a server (not shown) or any computing system similar to the exemplary computing system shown in FIG. 6. Further, a HCI node (300) reflects hyper-convergent architecture, thereby offering the integration of virtualization, compute, storage, and networking resources into a single solution. A HCI node (300) may include a node resource utilization agent (RUA) (302), node network resources (NNR) (304), node computer resources (NCR) (306), a hypervisor (308), one or more virtual machines (VMs) (310A-310N), a controller virtual machine (CVM) (316), a small computer system interface (SCSI) controller (320) (optionally), and node storage resources (NSR) (322). Each of these components is described below.

In one embodiment of the invention, the node RUA (302) may be a computer program or process (i.e., an instance of a computer program) that executes on the underlying hardware of the HCI node (300). Specifically, the node RUA (302) may be a computer program/process tasked with monitoring the utilization of virtualization, compute, storage, and/or network resources on the HCI node (300). Thus, the node RUA (302) may include functionality to: monitor the utilization of NNR (304) to obtain network resource utilization parameters (RUPs); monitor the utilization of NCR (306) to obtain compute RUPs; monitor the utilization of VMs (310A-310N) (i.e., virtualization resources) to obtain virtualization RUPs; monitor the utilization of NSR (322), via the CVM (316), to obtain storage RUPs; and provide these aggregated RUPs to the environment resource monitor (ERM) (326) periodically through pull and/or push mechanisms.

In one embodiment of the invention, a node network resource (NNR) (304) may refer to a measurable quantity of a network-relevant resource type that can be requested, allocated, and consumed. A network-relevant resource type may pertain to a physical device (i.e., hardware), a logical intelligence (i.e., software), or a combination thereof, which provides some networking functionality to the HCI node (300). Further, each network-relevant resource type may be quantified through a respective base unit. By way of examples, a network interface card (NIC) or a network adapter may be a network-relevant resource type, which may be specified in base units of bits per second (bps). Moreover, RUPs directed to NNRs (304) may include, but are not limited to: network bandwidth, network latency, network throughput, network jitter, etc.

In one embodiment of the invention, a node compute resource (NCR) (306) may refer to a measurable quantity of a compute-relevant resource type that can be requested, allocated, and consumed. A compute-relevant resource type may pertain to a physical device (i.e., hardware), a logical intelligence (i.e., software), or a combination thereof, which provides some computing functionality to the HCI node (300). Further, each compute-relevant resource type may be quantified through a respective base unit. By way of an example, a central processing unit (CPU) or a graphical processing unit (GPU) may be a compute-relevant resource type, which may be specified in base units of cores. By way of another example, memory may be another compute-relevant resource type, which may be specified in base units of bytes. Moreover, RUPs directed to NCRs (306) may include, but are not limited to: CPU/GPU utilization percentage, CPU/GPU wait time, random access memory (RAM) utilization percentage, etc.

In one embodiment of the invention, the hypervisor (308) may be a computer program or process (i.e., an instance of a computer program) that executes on the underlying hardware of the HCI node (300). Specifically, the hypervisor (308) may be a computer program/process tasked with managing one or more VMs (310A-310N), which may be executing on the HCI node (300). Thus, the hypervisor (308) may include functionality to: create or delete one or more VMs (310A-310N); allocate or deallocate host (i.e., HCI node (300)) resources to support the execution of one or more VMs (110A-110N) and their intended functionalities; and maintain intra-host communication between the one or more VMs (310A-310N) and other HCI node (300) components (e.g., the node RUA (302), the CVM (316), etc.). One of ordinary skill will appreciate that the hypervisor (308) may perform other functionalities without departing from the scope of the invention.

In one embodiment of the invention, a VM (310A-310N) may be a computer program that executes on the underlying hardware of the HCI node (300). Specifically, a VM (310A-310N) may be a computer program that emulates a physical computing system (see e.g., FIG. 6) and, thus, provides a self-contained execution environment on which other operating systems (OSs) (314) distinct from the host OS and other applications (312) (i.e., computer programs) may execute. A VM (310A-310N) may access the underlying host (i.e., HCI node (300)) hardware using an abstraction layer—e.g., the hypervisor (308).

In one embodiment of the invention, a node virtualization resource may refer to a measurable quantity of a virtualization-relevant resource type that can be requested, allocated, and consumed. A virtualization-relevant resource type may pertain to a physical device (i.e., hardware), a logical intelligence (i.e., software), or a combination thereof, which provides some virtualization functionality to the HCI node (300). Further, each virtualization-relevant resource type may be quantified through a respective base unit. By way of an example, a VM (310A-310N) or a container may each be a virtualization-relevant resource type, which may each be specified in base units of virtual CPUs (vCPU), where each vCPU may be viewed as a single physical CPU core. Moreover, RUPs directed to node virtualization resources may include, but are not limited to: VM disk input-output (IO) latency, VM input-output operations per second (IOPS), etc.

In one embodiment of the invention, the CVM (316) may a computer program that executes on the underlying hardware of the HCI node (300). Specifically, the CVM (316) may be a computer program tasked with managing and servicing all IO operations between the hypervisor (308), the one or more VMs (310A-310N), and the NSR (322). The CVM (316) may also include functionality to communicate with other CVMs (318) on other HCI nodes (not shown) in a HCI cluster (not shown) to at least manage and maintain the cluster distributed file system (DFS) (324) (described above). Towards managing and maintaining the cluster DFS (324), the CVM (316) may include further functionality to interface with the SCSI controller (320), if integrated into the HCI node (300), or may interface with the NSR (322) directly. Moreover, the CVM (316) may include functionality to monitor NSR (322) utilization and, subsequently, report on NSR (322) utilization to the node RUA (302).

In one embodiment of the invention, the SCSI controller (320) may be a physical device that enables one or more SCSI-compatible storage devices (e.g., hard disk drives (HDDs), solid state drives (SSDs), etc.) to communicate with other entities (e.g., host OS (not shown), the CVM (316), etc.) in a host computing system (i.e., the HCI node (300)). Another designation for the SCSI controller (320) is a host bus adapter (HBA). The SCSI controller (320) may include functionality to service IO requests from other entities that may be directed to one or more storage devices (i.e., NSR (322)) that which the SCSI controller (320) manages. In one embodiment of the invention, the HCI node (300) may include the SCSI controller (320), thereby requiring other entities to connect and communicate indirectly to the NSR (322) through the SCSI controller (320). In another embodiment of the invention, the HCI node (300) may not include a SCSI controller (320), wherein other entities may include functionality to connect and directly communicate with the NSR (322).

In one embodiment of the invention, a node storage resource (NSR) (322) may refer to a measurable quantity of a storage-relevant resource type that can be requested, allocated, and consumed. A storage-relevant resource type may pertain to a physical device (i.e., hardware), a logical intelligence (i.e., software), or a combination thereof, which provides some storage functionality to the HCI node (300). Further, each storage-relevant resource type may be quantified through a respective base unit. By way of examples, a hard disk drive (HDD), a solid state drive (SSD), and flash memory may each be a storage-relevant resource type, which may each be specified in base units of bytes. Moreover, RUPs directed to NSRs (322) may include, but are not limited to: disk input-output (IO) latency, disk IO throughput, disk access or response time, etc.

Figure 4:
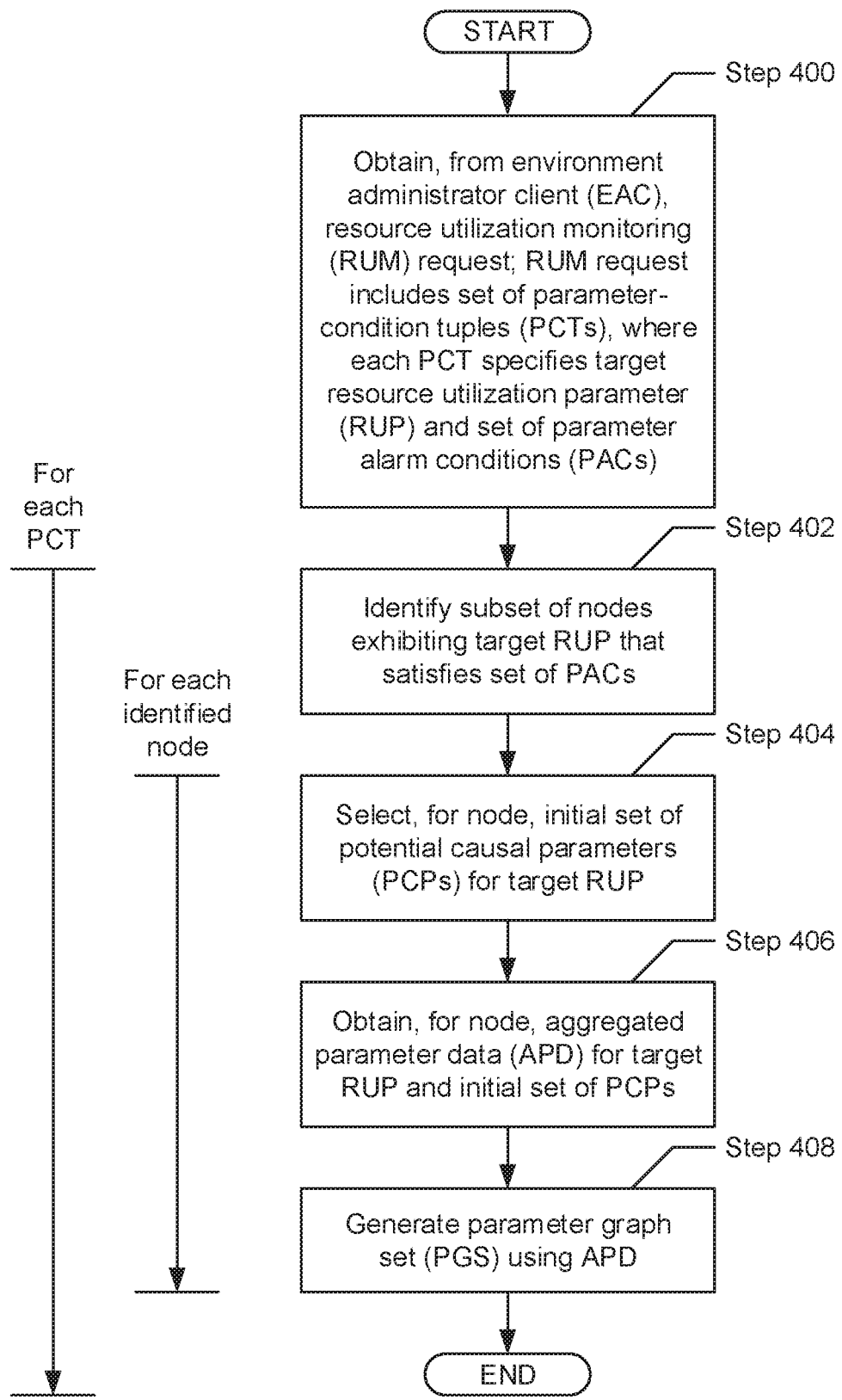
FIG. 4 shows a flowchart describing a method for generating a dashboard initial state in accordance with one or more embodiments of the invention.

FIG. 4 shows a flowchart describing a method for generating a dashboard initial state in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 4 may be performed in parallel with any other steps shown in FIGS. 5A and 5B without departing from the scope of the invention.

Turning to FIG. 4, in Step 400, a resource utilization monitoring (RUM) request is obtained. In one embodiment of the invention, the RUM request may have been submitted by an environment administrator client (EAC) (see e.g., FIG. 1). Further, the RUM request may include a set of one or more parameter-condition tuples (PCTs). Each PCT may specify a target resource utilization parameter (RUP) and a set of one or more parameter alarm conditions (PACs) that tie to the target RUP. In one embodiment of the invention, a target RUP may refer to a RUP of interest to a hyper-converged infrastructure (HCI) environment administrator. That is, a target RUP may refer to a RUP tracked in one or more HCI nodes of the HCI environment that which an administrator wishes, or deems necessary, to monitor. In one embodiment of the invention, a PAC may refer to a threshold value or range of values respective to the target RUP, which when met, may issue an alarm that alerts the HCI environment administrator. By way of an example, for a target RUP directed to virtual machine (VM) disk input-output (IO) latency, a respective PAC may issue an alarm if the target RUP exceeds a specific value (e.g., 10 milliseconds). By way of another example, for a target RUP directed to a number of packets transmitted by a VM, a respective PAC may issue an alarm if the target RUP exceeds a specified number of packets during a specified timeframe.

In one embodiment of the invention, Steps 402 through 408 may be performed or repeated for each PCT of the set of PCTs (included in the RUM request obtained in Step 400). In one embodiment of the invention, each iteration of these steps, representing the processing of each PCT, may be performed sequentially—i.e., a second PCT may be processed after a first PCT has been processed. In another embodiment of the invention, each iteration of these steps, representing the processing of each PCT, may be performed in parallel—i.e., a first PCT and a second PCT may be processed concurrently.

Proceeding with the method, in Step 402, for each PCT, a subset of HCI nodes (of one or more sets of HCI nodes—i.e., one or more HCI clusters) in an HCI environment is identified. In one embodiment of the invention, each HCI node in the subset of HCI nodes may exhibit the target RUP (specified in the PCT) satisfying the set of PACs (also specified in the PCT). For example, assume all HCI nodes in the HCI environment have been configured to monitor the target RUP—e.g., VM disk IO latency. Further, through the RUM request, a PAC respective to the target RUP—e.g., excess over 10 milliseconds—is disseminated to all HCI nodes. Accordingly, for each HCI node, a determination may be made as to whether the target RUP, monitored on the HCI node, satisfies the PAC—i.e., whether the VM disk IO latency exceeds 10 milliseconds. If it is determined that VM disk IO latency observed on the HCI node meets or exceeds 10 milliseconds, then that HCI node may be identified as one of the HCI nodes in the subset of HCI nodes. Substantively, the exemplified determination may be performed for each HCI node in the HCI environment to identify a subset of one or more HCI nodes, which may be associated with a respective target RUP that satisfies one or more PACs.

In one embodiment of the invention, Steps 404 through 408 may be performed or repeated for each HCI node in the subset of HCI nodes (identified in Step 402). In one embodiment of the invention, each iteration of these steps, directed to a HCI node, may be performed sequentially—i.e., a second HCI node may be processed after a first HCI node has been processed. In another embodiment of the invention, each iteration of these steps, directed to a HCI node, may be performed in parallel—i.e., a first HCI node and a second HCI node may be processed concurrently.

Hereinafter, in Step 404, for each HCI node in the subset of HCI nodes, an initial set of potential causal parameters (PCPs) for the target RUP (specified in the PCT being processed) is selected. In one embodiment of the invention, a PCP may be a RUP (i.e., other than the target RUP) that, at the outset, may have a causal relationship with the target RUP. As mentioned above, in the simplest case, a causal relation between two variables exists if the presence of (or an action induced by) the first variable affects the presence of (or an action induced by) the second variable. With reference to this definition, a PCP may refer to the first variable, whereby the presence of (or an action induced by) the PCP may affect the presence of (or an action induced by) the target RUP—i.e., the second variable. Subsequently, one or more PCPs (i.e., other RUPs), which appear to cause or manipulate the behavior of the target RUP, may be selected.

In one embodiment of the invention, selection of the initial set of PCPs may entail referring to known causal and/or correlation mappings involving the target RUP and one or more other RUPs. These one or more other RUPs may be selected into the initial set of PCPs. Further, the aforementioned mappings may be stored in the data repository residing on the environment resource monitor (ERM) (see e.g., FIG. 2) and may be stored thereon as rules set by an HCI environment administrator. In another embodiment of the invention, selection of the initial set of PCPs may entail referring to historical results and/or analyses, which may have been generated through previous or past observations or empirical evidence. These historical results and/or analyses may demonstrate causal and/or correlation relationships between the target RUP and one or more other RUPs. Similarly, these one or more other RUPs may be selected into the initial set of PCPs. Further, these aforementioned historical results and/or analyses may also be stored in the data repository of the ERM, and accordingly, may be stored therein by the causality analyzer (CA), via the ERM kernel (EK) (see e.g., FIG. 2), which may have processed previous RUM requests to attain the historical results and/or analyses. By way of an example, a PCP for the target RUP of VM disk IO latency may be directed to the central processing unit (CPU) utilization on the controller virtual machine (CVM) (see e.g., FIG. 3).

In Step 406, for each HCI node in the subset of HCI nodes, aggregated parameter data (APD) is obtained. In one embodiment of the invention, the APD may pertain to the target RUP (specified in the PCT currently being processed) and the initial set of PCPs for the target RUP (selected in Step 404). That is, APD associated with the target RUP, as well as APD associated with each PCP in the initial set of PCPs, may be obtained. APD may refer to a time-series (i.e., a series of data points indexed in time order) conveying historical and/or real-time measurements of a particular variable/parameter. Subsequently, APD pertaining to the target RUP may be a time-series of target RUP measurements, whereas ADP pertaining to a PCP may be a time-series of that PCP's measurements.

As described above, in one embodiment of the invention, the node resource utilization agent (RUA) (see e.g., FIG. 3) executing on each HCI node may monitor various utilization parameters directed to HCI node compute, storage, network, and virtualization resources; and, subsequently, provide values respective to these utilization parameters to the ERM periodically through pull and/or push mechanisms. Thereafter, the node information aggregator (NIA) (see e.g., FIG. 2) at the ERM may aggregate these utilization parameter values, across all HCI nodes, and store them as amendments to time-series, representative of the utilization parameters (i.e., RUPs), in the data repository via the EK. Accordingly, in obtaining APD for a target RUP and one or more PCPs, the various APD, in one embodiment of the invention, may be retrieved from the data repository. In another embodiment of the invention, a real-time stream of the time-series of measurements may be accessed through the NIA directly. In yet another embodiment of the invention, APD for a parameter may entail a combination of retrieving historical measurements stored in the data repository, as well as retrieving present or real-time measurements received periodically at the NIA.

In Step 408, a parameter graph set (PGS) is generated using the APDs (obtained in Step 406). In one embodiment of the invention, the PGS may refer to a set of two or more graphical representations (e.g., line graphs or scatter plots), which visualize the obtained measurements pertaining to the target RUP and the one or more PCPs (in the initial set of PCPs) that may be causally affecting the target RUP. Further, upon generation of the PGS, the PGS may subsequently be presented to the EAC (whom submitted the RUM request in Step 400) through a user interface (e.g., a web-based or non-web-based dashboard) extending from the application programming interface (API) of the ERM (see e.g., FIG. 2; see also, FIG. 7D).

Figure 5A:
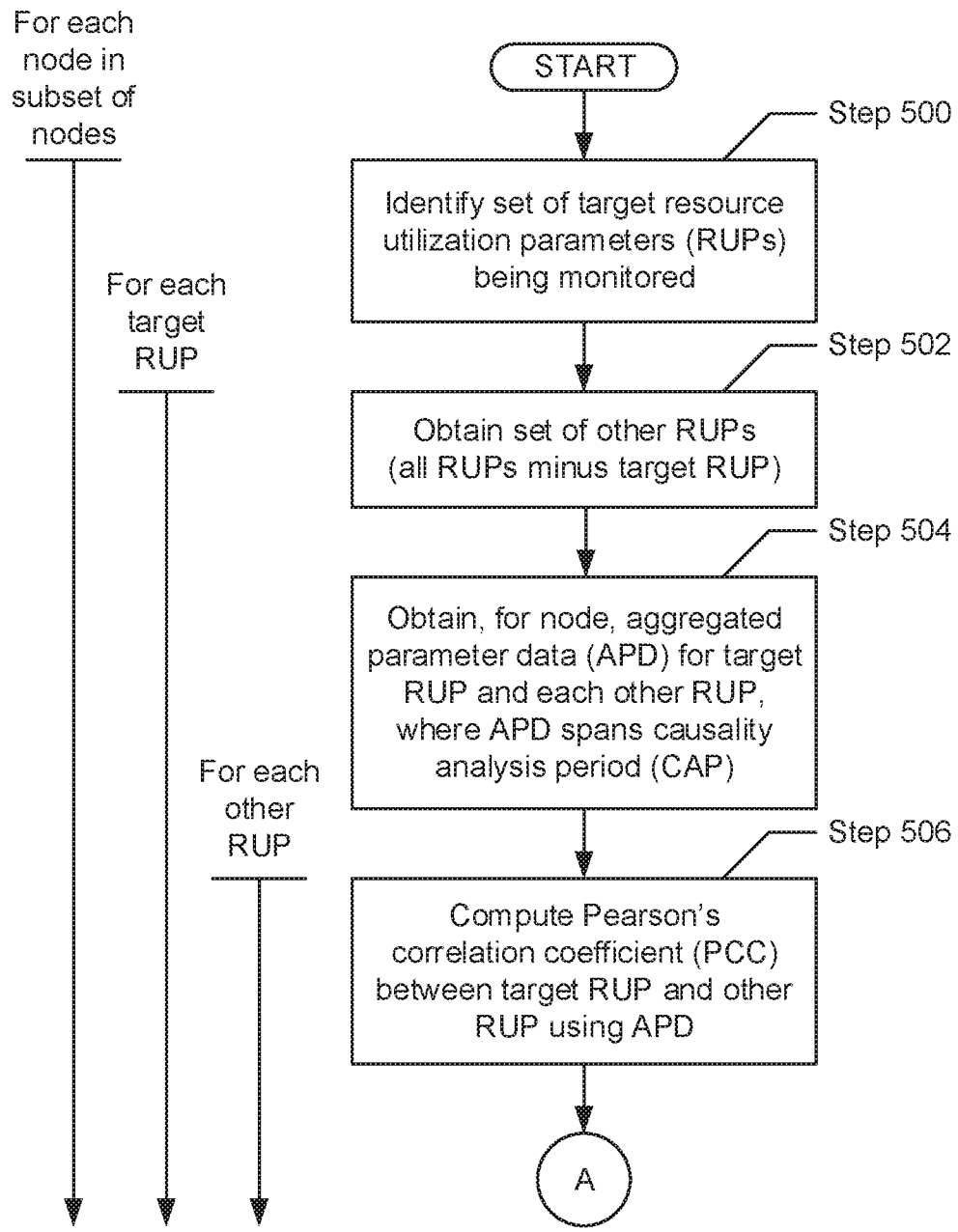
FIGS. 5A and 5B show flowcharts describing a method for generating a dashboard updated state in accordance with one or more embodiments of the invention.
Figure 5B:
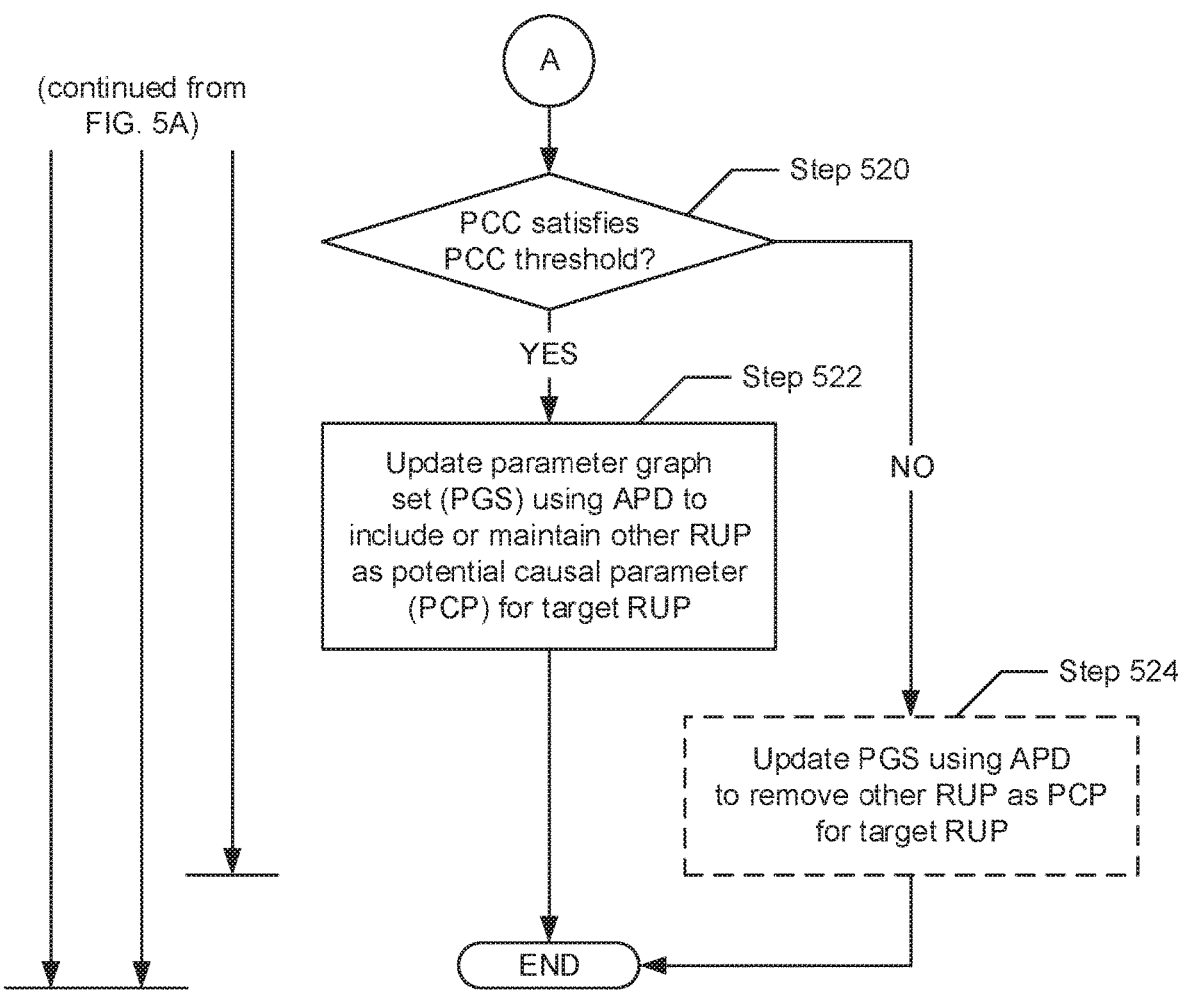

FIGS. 5A and 5B show flowcharts describing a method for generating a dashboard updated state in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIGS. 5A and 5B may be performed in parallel with any other steps shown in FIG. 4 without departing from the scope of the invention.

In one embodiment of the invention, Steps 500 through 524 may be performed or repeated for each HCI node in a subset of HCI nodes that, at least in part, constitute an HCI environment. Each HCI node in the subset of HCI nodes may exhibit at least one target RUP that satisfies one or more respective PACs (see e.g., FIG. 4), which may have been brought about per processing of one or more RUM requests. Further, in one embodiment of the invention, each iteration of these aforementioned steps, directed to a HCI node, may be performed sequentially—i.e., a second HCI node may be processed after a first HCI node has been processed. In another embodiment of the invention, each iteration of these aforementioned steps, directed to a HCI node, may be performed in parallel—i.e., a first HCI node and a second HCI node may be processed concurrently.

Turning to FIG. 5A, in Step 500, for each HCI node in the subset of HCI nodes, a set of one or more target RUPs, which is being monitored, is identified. As mentioned earlier, the set of target RUPs may have been subjected to monitoring as a result of the processing of one or more resource utilization monitoring (RUM) requests (see e.g., FIG. 4). Further, the target RUP(s) being monitored for each HCI node may be different based on whether the target RUP(s) measured at each HCI node satisfied one or more parameter alarm conditions (PACs) specified in the RUM request(s). That is, the exhibition of utilization parameters on any one HCI node may differ from any other HCI node based on, for example, the different workloads executing on the different HCI nodes and the configuration of different resources available on the different HCI nodes.

In one embodiment of the invention, Steps 502 through 524 may be performed or repeated for each target RUP in the set of target RUPs being monitored (identified in Step 500). In one embodiment of the invention, each iteration of these aforementioned steps, directed to a target RUP, may be performed sequentially—i.e., a second target RUP may be processed after a first target RUP has been processed. In another embodiment of the invention, each iteration of these aforementioned steps, directed to a target RUP, may be performed in parallel—i.e., a first target RUP and a second target RUP may be processed concurrently.

Proceeding with the method, in Step 502, for each target RUP specified in the set of target RUPs, a set of other RUPs is obtained. In one embodiment of the invention, the set of other RUPs may include all utilization parameters directed to HCI node compute, storage, network, and virtualization resources (across the entire HCI environment), excluding the current target RUP being processed. For example, for a target RUP of VM disk IO latency, the set of other RUPs may specify all RUPs measured throughout the HCI environment, minus the target RUP. In reference to set theory, the target RUP may represent a Set A (including just one element—i.e., the target RUP) and the set of other RUPs may represent the complement of Set A, thus referring to all elements in a superset (i.e., all RUPs) not in, or excluding the elements in, Set A.

In Step 504, aggregated parameter data (APD) directed to the target RUP (being currently processed) and each other RUP in the set of other RUPs (obtained in Step 502) is obtained. In one embodiment of the invention, APD may refer to a time-series (i.e., a series of data points indexed in time order) conveying historical and/or real-time measurements of a particular variable/parameter. Subsequently, APD pertaining to the target RUP may be a time-series of target RUP measurements, whereas APD pertaining to another RUP may be a time-series of that other RUP's measurements. Furthermore, in one embodiment of the invention, the various APD may pertain to: historical measurements stored in a data repository of an environment resource monitor (ERM) (see e.g., FIG. 2); real-time measurements periodically received at a node information aggregator (NIA) executing on the ERM; or a combination thereof. Moreover, in one embodiment of the invention, the APD (across the target RUP and each other RUP) may be obtained such that the APD spans a causality analysis period (CAP). The CAP may refer to a minimum or threshold length of time (or a minimum/threshold sample size) expressed in each obtained time-series of measurements, where the minimum/threshold length of time or sample size is optimal for conducting the causality and/or correlation algorithms to follow (see e.g., Step 506). Further, the CAP may be a static or dynamic variable that may be determined by HCI environment administrators, and may subsequently be stored in, and thus retrieved from, the data repository of the ERM.

In one embodiment of the invention, Steps 506 through 524 may be performed or repeated for each other RUP in the set of other RUPs (obtained in Step 502). In one embodiment of the invention, each iteration of these aforementioned steps, directed to one other RUP, may be performed sequentially—i.e., a second other RUP may be processed after a first other RUP has been processed. In another embodiment of the invention, each iteration of these aforementioned steps, directed to one other RUP, may be performed in parallel—i.e., a first other RUP and a second other RUP may be processed concurrently.

In Step 506, a Pearson correlation coefficient (PCC), between the target RUP and each other RUP in the set of other RUPs, is computed. In one embodiment of the invention, each PCC may be a measure of linear correlation between the target RUP and one other RUP. Regarding the PCC, the PCC may be a numerical value (i.e., a real number) that may range from positive one (+1) to negative one (−1), where a PCC of positive one is representative of total positive linear correlation, where a PCC of zero (0) is representative of no linear correlation, and where a PCC of negative one is representative of total negative linear correlation. Also regarding the PCC, opinions differ, however, one interpretation of there being a strong correlation between two variables is when the PCC between those two variables is computed to be positive (+) 0.5 or greater. This threshold value, indicative of a strong correlation between variables, may be disclosed herein as the PCC threshold (see e.g., Step 520 in FIG. 5B). Furthermore, the measure computed here in Step 506 is not limited to the PCC. That is, other causality or correlation driven measures employed in other algorithms—e.g., the Granger causality algorithm, the Kendall correlation algorithm, and the Spearman correlation algorithm—may be computed instead.

Turning to FIG. 5B, in Step 520, a determination is made as to whether the PCC (computed between the target RUP and the one other RUP currently being processed in Step 506) satisfies a PCC threshold. In one embodiment of the invention, the PCC threshold (as mentioned above), may refer to a threshold PCC value—e.g., positive (+) 0.5—which may be indicative of a strong correlation between the measured variables (i.e., the target RUP APD and the one other RUP APD). Further, a strong correlation between the target RUP and the one other RUP may be indicative that the one other RUP may be a strong contender or factor that may be affecting or manipulating the behavior of the target RUP. In one embodiment of the invention, the PCC threshold may be a static or dynamic variable that may be determined by HCI environment administrators, and may subsequently be stored in, and thus retrieved from, the data repository of the ERM. Subsequently, if it is determined that the PCC satisfies the PCC threshold, then the process proceeds to Step 522. On the other hand, if it is alternatively determined that the PCC does not satisfy the PCC threshold, then the process alternatively proceeds to Step 524.

In Step 522, after determining (in Step 520) that the PCC (computed in Step 506) satisfies the PCC threshold, a parameter graph set (PGS) is updated. Specifically, in one embodiment of the invention, the PGS may be updated to include or maintain the one other RUP as a potential causal parameter (PCP) for the target RUP. That is, in one embodiment of the invention, had the one other RUP not been previously identified as a PCP for the target RUP (via, for example, the selection of the initial set of PCPs—see e.g., FIG. 4), then the initial or a previously updated set of PCPs may be amended to include the one other RUP, thereby obtaining an updated set of PCPs. In another embodiment of the invention, had the one other RUP been previously identified as a PCP for the target RUP, then the one other RUP may remain in the set of PCPs that may be affecting the target RUP. Furthermore, the PGS may refer to a set two or more graphical representations (e.g., line graphs or scatter plots), which visualize the obtained measurements (or APD) pertaining to the target RUP and the one or more PCPs (in the initial/updated set of PCPs) that may be impacting the behavior of the target RUP. Moreover, updating of the PGS may entail: (a) maintaining the depiction of a graphical representation, conveying APD for the one other RUP, on a user interface (e.g., a web-based or non-web-based dashboard) extending from the API of the ERM (see e.g., FIG. 2; see also, FIG. 7E); or (b) adding a graphical representation, conveying APD for the one other RUP, to the web-based interface.

In Step 524, after determining (in Step 520) that the PCC (computed in Step 506) does not satisfy the PCC threshold, a PGS is updated. Specifically, in one embodiment of the invention, the PGS may be updated to remove the one other RUP as a PCP for the target RUP, if the one other RUP had been previously identified as a PCP; or alternatively, to maintain the exclusion of the one other RUP from the set of PCPs that may be affecting the target RUP. That is, in one embodiment of the invention, had the one other RUP been previously identified as a PCP for the target RUP (via, for example, the selection of the initial set of PCPs), then the initial or a previously updated set of PCPs may be amended to remove the one other RUP, thereby obtaining a first or another updated set of PCPs. In another embodiment of the invention, had the one other RUP not been previously retained in the initial or previously updated set of PCPs, then nothing may change. Moreover, updating of the PGS may entail removing/deleting the depiction of a graphical representation, conveying APD for the one other RUP, on a user interface (e.g., a web-based or non-web-based dashboard) extending from the API of the ERM (see e.g., FIG. 2; see also, FIG. 7E).

Figure 6:
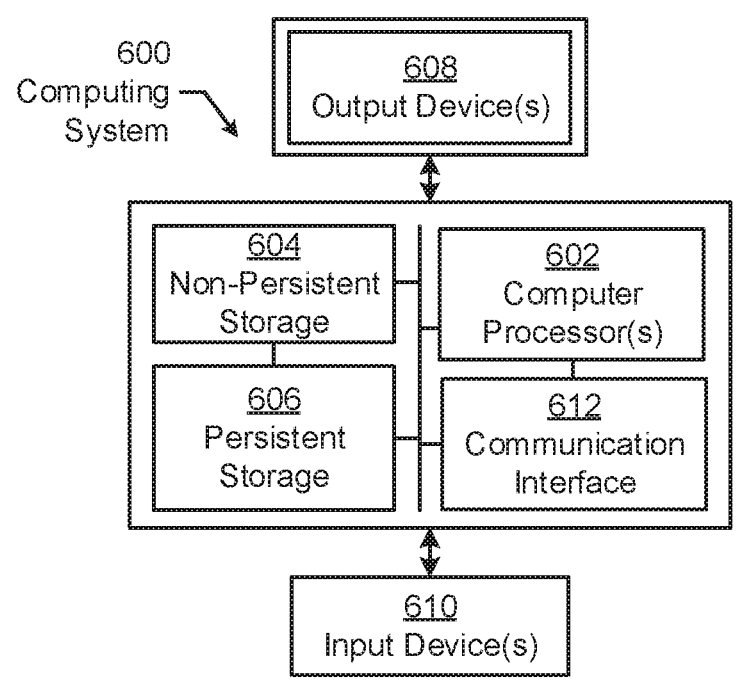
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

FIGS. 7A-7E show various aspects pertaining to an example in accordance with one or more embodiments of the invention. The following example, presented in conjunction with components shown in FIGS. 7A-7E, is for explanatory purposes only and not intended to limit the scope of the invention.

Figure 7A:
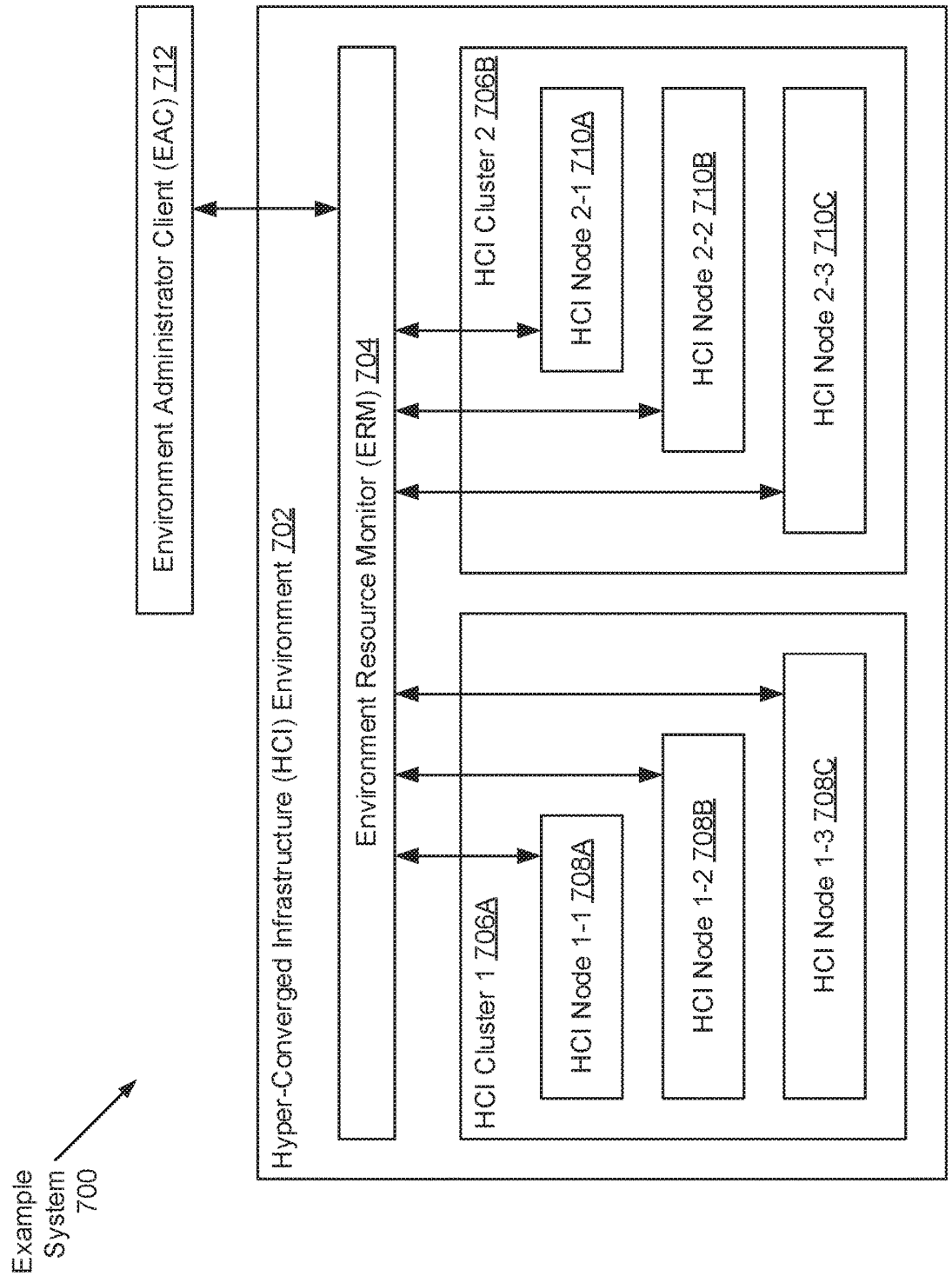
FIG. 7A shows an example system in accordance with one or more embodiments of the invention.
Figure 7C:
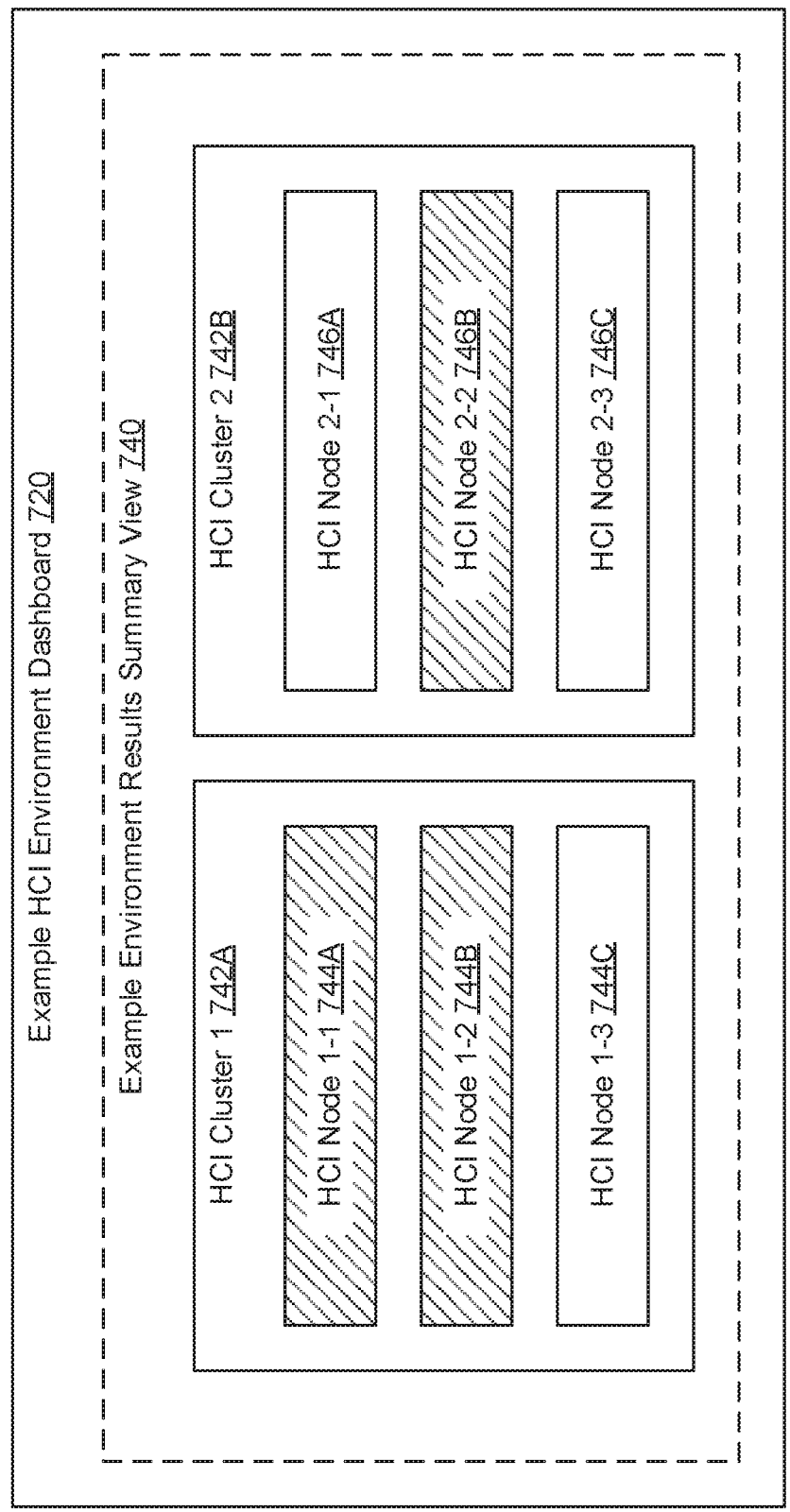
FIG. 7C shows an example environment results summary view of an example hyper-converged infrastructure environment dashboard in accordance with one or more embodiments of the invention.

Turning to FIG. 7A, FIG. 7A shows an example system in accordance with one or more embodiments of the invention. The example system (700) includes a HCI environment (702) and an environment administrator client (EAC) (712). The HCI environment (702) includes an environment resource monitor (ERM) (704) operatively connected to the EAC (712). The HCI environment (702) further includes a first HCI cluster (706A) and a second HCI cluster (706B). The first HCI cluster (706A) includes three nodes: HCI node 1-1 (708A), HCI node 1-2 (708B), and HCI node 1-3 (708C)—each of which is operatively connected to the ERM (704). Further, the second HCI cluster (706B) also includes three nodes: HCI node 2-1 (710A), HCI node 2-2 (710B), and HCI node 2-3 (710C)—each of which is also operatively connected to the ERM (704).

Turning to the example, consider a scenario whereby an operator of the EAC (712)—i.e., an administrator of the HCI environment (702)—accesses the ERM (704) to investigate the root cause of a persistent issue or failure occurring across the HCI environment (702). Subsequently, via the EAC (712), the operator loads up their web browser and enters the assigned uniform resource locator (URL) for the HCI environment dashboard, thereby accessing HCI environment (702) information aggregated by the ERM (704). The operator thus arrives at the example HCI environment dashboard (720) portrayed in FIG. 7B. The example dashboard (720) can be a web-based or non-web-based interface. More specifically, the operator may arrive at an example resource utilization monitoring (RUM) request view (722) of the example dashboard (720).

The example RUM request view (722) may enable the operator to submit RUM requests, for monitoring utilization information pertaining to resources of interest, to the ERM (704). Further, the example RUM request view (722) may depict various graphical user interface (GUI) objects, including: a target resource utilization parameters (RUPs) (724) section; a parameter alarm conditions (PACs) section (726); a clear button (728); and a submit button (730). The target RUPs section (724) may include various check-boxes, where each check-box is labeled and associated with one RUP of a collection of RUPs that may be monitored throughout the HCI environment (702). For the example, assume the operator selects the check-boxes associated with RUPs B, E, F, and J, thereby, selecting these aforementioned RUPs as target RUPs (or RUPs of interest, which may or may not be root causes of the above-mentioned persistent issue/failure occurring across the HCI environment (702)).

The PACs section (726) may initially be blank when the example RUM request view (722) first loads, however, populates once one or more RUPs are selected as target RUPs, by the operator, in the target RUPs section (724). Once populated, the PACs section (726) may present an editable text-box, as well as a corresponding label, for each target RUP selected earlier. Each editable text-box may allow the operator to enter one or more PACs for each selected target RUP. By way of an example, assume selected RUP B pertains to virtual machine (VM) disk input-output (IO) latency. The operator may then enter the string ">10 ms" in the editable text-box in the PACs section (726) for RUP B, thus, implying that the ERM would alert the operator should the VM disk IO latency exceed 10 milliseconds. Assume the operator proceeds to enter respective PACs—i.e., PAC set B, PAC set E, PAC set F, and PAC set J—for each target RUP selected earlier. After, entering the appropriate information, the operator proceeds to interact with the submit button (730), thereby completing and submitting the selected/entered information, as a RUM request, to the ERM (704).

Upon receiving the four target RUPs and their respective PAC sets, the ERM (704) proceeds to process the RUM request in accordance with embodiments of the invention (see e.g., FIG. 4). Specifically, the ERM (704), for each target RUP and respective PAC set, may first identify a subset of one or more HCI nodes, which exhibit the target RUP satisfying the PAC set. By way of the VM disk IO latency target RUP example, the subset of HCI nodes identified by the ERM (704) may include HCI nodes where measured values directed to VM disk IO latency, has historically or is presently, above the specified 10 millisecond PAC. Hereafter, the ERM (704) may transition from the example RUM request view (722) of the example dashboard (720) to an example environment results summary view (740) portrayed in FIG. 7C. The example environment results summary view (740) depicts the subset of HCI nodes that have been identified to exhibit at least one of the selected target RUPs, which satisfy their respective PAC set. For this example, assume HCI node 1-3 (708C) of the first HCI cluster (706A) and HCI nodes 2-1 (710A) and 2-3 (710C) of the second HCI cluster (706B) have been identified into the aforementioned subset of HCI nodes.

Further, the example environment results summary view (740) may show various GUI objects, which include: a first HCI cluster section (742A) associated with the first HCI cluster (706A) and a second HCI cluster section (742B)

associated with the second HCI cluster (706B). The first HCI cluster section (742A) may include three push buttons directed to HCI node 1-1 (744A), HCI node 1-2 (744B), and HCI node 1-3 (744C). The first HCI cluster section (742A) may also show the HCI node 1-1 and 1-2 push buttons (744A, 744B) as disabled, or grayed out, based on the ERM (704) not identifying HCI nodes 1-1 and 1-2 (708A, 708B) as exhibiting at least one target RUP that satisfies its respective PAC set. Moreover, the second HCI cluster section (742B) may also include three push buttons directed to HCI node 2-1 (746A), HCI node 2-2 (746B), and HCI node 2-3 (746C). The second HCI cluster section (742B) may also show the HCI node 2-2 push button (746B) as disabled, or grayed out, based on the ERM (704) not identifying HCI node 2-2 (710B) as exhibiting at least one target RUP that satisfies its respective PAC set.

Figure 7D:
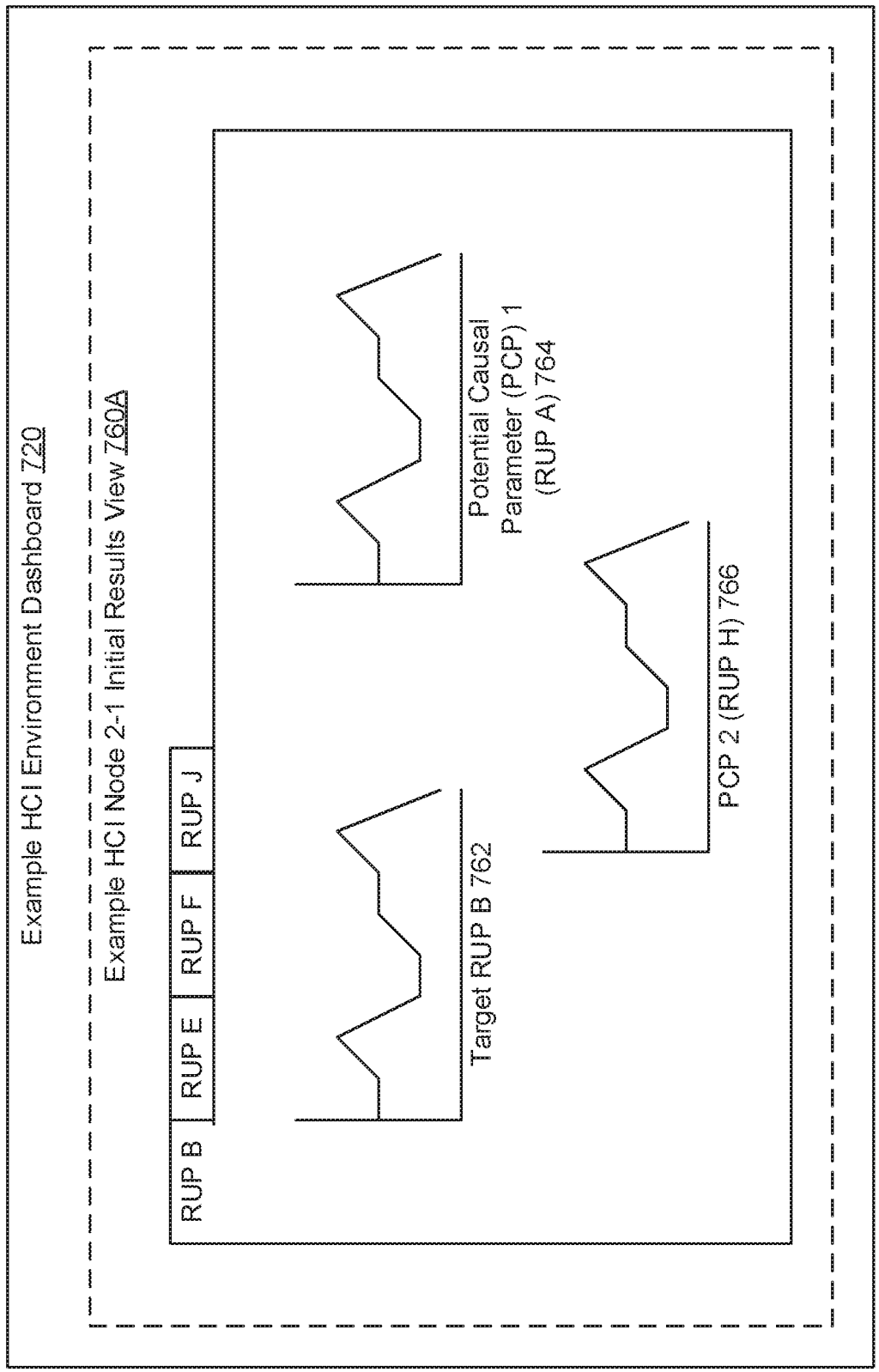
FIG. 7D shows an example hyper-converged infrastructure node initial results view of an example hyper-converged infrastructure environment dashboard in accordance with one or more embodiments of the invention.

Proceeding with the example, assume, at this point, the operator wishes to ascertain the role of target RUPs measured on HCI node 2-1 (710A), and thus, interacts with the HCI node 2-1 push button (746A). Engaging of the aforementioned push button presents the operator, via the example dashboard (720), with an example initial results view (760A), portrayed in FIG. 7D, for HCI node 2-1 (710A). The example initial results view (760A) may portray various GUI objects, which include: a multi-tabbed panel, where each tab pertains to one of the selected target RUPs—i.e., RUP B, RUP E, RUP F, and RUP J. Further, populated in each tab is a parameter graph set (PGS) pertinent to a respective target RUP. FIG. 7D shows the PGS pertinent to target RUP B. Following embodiments of the invention (see e.g., FIG. 4), the ERM (704) may have aggregated parameter data (APD) for target RUP B, as well as one or more potential causal parameters (PCPs) that may be affecting the behavior of target RUP B; and subsequently, populated the RUP B tab of the initial results view (760) using generated graphical representations for target RUP B (762) and the PCPs—e.g., RUP A as PCP 1 (764) and RUP H as PCP 2 (766).

During continued monitoring of the target RUPs, the ERM, (704) in accordance with one or more embodiments of the invention (see e.g., FIGS. 5A and 5B), obtains APD for target RUP B and each of the various other RUPs monitored through the HCI environment (702)—e.g., RUPs A and C through L. Furthermore, using the obtained APD, the ERM (704) computes the Pearson correlation coefficient (PCC) between target RUP B and each other RUP, thereby obtaining a set of PCCs. Subsequently, each PCC—directed to one of the other RUPs—is compared against a PCC threshold (e.g., +0.5). Based on the comparisons, any other RUP associated with a PCC that satisfies the PCC threshold is identified or maintained as a PCP for target RUP B. For the example, assume other RUPs A, C, and G are identified or maintained as PCPs for target RUP B. Accordingly, the ERM (704) updates the example initial results view (760A) to obtain an example updated results view (760B).

Figure 7E:
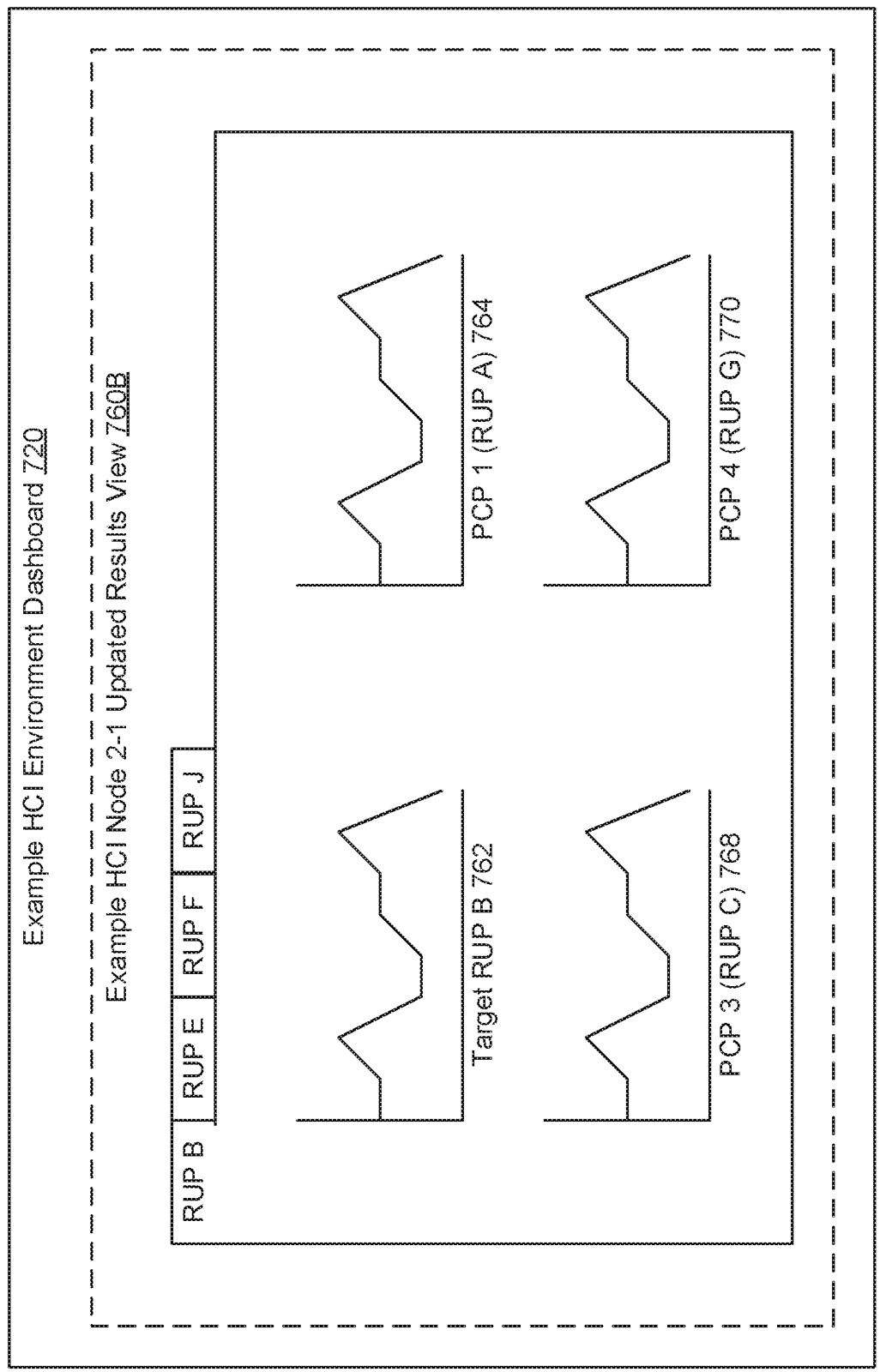
FIG. 7E shows an example hyper-converged infrastructure node updated results view of an example hyper-converged infrastructure environment dashboard in accordance with one or more embodiments of the invention.

The example updated results view (760B), similar to the example initial results view (760A), portrays a multi-tabbed panel, where each tab pertains to one of the selected target RUPs. Further, populated in each tab is an updated PGS pertinent to a respective target RUP. FIG. 7E shows the updated PGS pertinent to target RUP B. Moreover, because, as assumed above that other RUPs A, C, and G are identified/maintained as PCPs for target RUP B: the graphical representation for PCP 1 (764)—i.e., RUP A—is maintained; the graphical representation for PCP 2 (766)—i.e., RUP H—is removed; the graphical representation for a new PCP 3 (768)—i.e., RUP C—is added; and a graphical representation for a new PCP 4 (770)—i.e., RUP G—is also added. Substantively, the ERM (704), through the HCI environment dashboard (720), keeps the operator continuously apprised of utilization measurements pertaining to the selected target RUPs and dynamically changing PCPs for each target RUP for each identified HCI node of a subset of HCI nodes. The HCI environment dashboard (720) may thus be a useful tool, which may allow the operator to, in real-time, observe and/or identify which other RUPs are strong factors in manipulating one or more target RUPs. The target RUPs and/or any of the associated other RUPs may be root causes to the issues and/or failures the operator may be investigating.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dynamically populating a user interface, comprising:
    obtaining a resource utilization monitoring (RUM) request comprising a target resource utilization parameter (RUP) and a parameter alarm condition (PAC);
    identifying, from a set of nodes, a first node that exhibits the target RUP, wherein the target RUP satisfies the PAC;
    selecting, for the target RUP, a set of potential causal parameters (PCPs) comprising a first PCP and a second PCP;
    obtaining, associated with the first node, a first aggregated parameter data (APD) for the target RUP, a second APD for the first PCP, and a third APD for the second PCP;
    generating a first parameter graph set (PGS) comprising a first graphical representation for the target RUP based on the first APD, a second graphical representation for the first PCP based on the second APD, and a third graphical representation for the second PCP based on the third APD; and
    populating a first portion of the user interface reserved for the first node using the first PGS.

2. The method of claim 1, wherein the first APD is a time-series of measurements of the target RUP recorded on the first node.

3. The method of claim 1, wherein the first graphical representation is a line graph.

4. The method of claim 1, further comprising:
    identifying, for the target RUP, a set of other RUPs comprising at least one other RUP that is not the target RUP;
    obtaining, associated with the first node, a fourth APD for the target RUP, a fifth APD for the first PCP, a sixth APD for the second PCP, and a seventh APD for the at least one other RUP; and
    computing a measure value between the target RUP and the at least one other RUP, using the fourth APD and the seventh APD.

5. The method of claim 4, wherein the fourth APD comprises at least a portion of the first APD and new data pertaining to the target RUP.

6. The method of claim 4, wherein the measure value is a Pearson correlation coefficient (PCC).

7. The method of claim 4, wherein the fourth APD and the seventh APD each span at least a causality analysis period (CAP).

8. The method of claim 4, further comprising:
determining that the measure value satisfies a threshold measure value;
based on the determining:
appending, to the set of PCPs, the at least one other RUP as a third PCP;
updating the first PGS to obtain a second PGS comprising a fourth graphical representation for the target RUP based on the fourth APD, a fifth graphical representation for the first PCP based on the fifth APD, a sixth graphical representation for the second PCP based on the sixth APD, and a seventh graphical representation for the third PCP based on the seventh APD; and
populating the first portion of the user interface reserved for the first node using the second PGS.

9. The method of claim 4, further comprising:
determining that the measure value does not satisfy a threshold measure value;
based on the determining:
removing the first PCP from the set of PCPs, wherein the first PCP is the at least one other RUP;
updating the first PGS to obtain a second PGS comprising a fourth graphical representation for the target RUP based on the fourth APD and a fifth graphical representation for the second PCP based on the sixth APD; and
populating the first portion of the user interface reserved for the first node using the second PGS.

10. The method of claim 1, further comprising:
identifying, from the set of nodes, a second node that exhibits the target RUP satisfying the PAC;
obtaining, associated with the second node, a fourth APD for the target RUP, a fifth APD for the first PCP, and a sixth APD for the second PCP;
generating a second PGS comprising a fourth graphical representation for the target RUP based on the fourth APD, a fifth graphical representation for the first PCP based on the fifth APD, and a sixth graphical representation for the second PCP based on the sixth APD; and
populating a second portion of the user interface reserved for the second node using the second PGS.

11. A system, comprising:
a set of nodes each comprising a computer processor; and
an environment resource monitor (ERM) operatively connected to the set of nodes, and comprising a second computer processor programmed to:
obtain a resource utilization monitoring (RUM) request comprising a target resource utilization parameter (RUP) and a parameter alarm condition (PAC);
identify, from the set of nodes, a first node that exhibits the target RUP, wherein the target RUP satisfies the PAC;
select, for the target RUP, a set of potential causal parameters (PCPs) comprising a first PCP and a second PCP;
obtain, associated with the first node, a first aggregated parameter data (APD) for the target RUP, a second APD for the first PCP, and a third APD for the second PCP;
generate a first parameter graph set (PGS) comprising a first graphical representation for the target RUP based on the first APD, a second graphical representation for the first PCP based on the second APD, and a third graphical representation for the second PCP based on the third APD; and
populate a first portion of a user interface reserved for the first node using the first PGS.

12. The system of claim 11, further comprising an environment administrator client (EAC) operatively connected to the ERM, wherein the EAC submits the RUM request and accesses the user interface.

13. The system of claim 11, wherein the each node of the set of nodes is a hyper-converged infrastructure (HCI) server.

14. The system of claim 11, wherein each node of the set of nodes comprises a node resource utilization agent (RUA) responsible for aggregating utilization information pertaining to resources available on the node and periodically providing the utilization information to the ERM.

15. The system of claim 14, wherein the resources are at least one selected from a group consisting of compute resources, storage resources, network resources, and virtualization resources.

16. A non-transitory computer readable medium (CRM) comprising computer readable program code, which when executed by a computer processor, enables the computer processor to:
obtain a resource utilization monitoring (RUM) request comprising a target resource utilization parameter (RUP) and a parameter alarm condition (PAC);
identify, from a set of nodes, a first node that exhibits the target RUP, wherein the target RUP satisfies the PAC;
select, for the target RUP, a set of potential causal parameters (PCPs) comprising a first PCP and a second PCP;
obtain, associated with the first node, a first aggregated parameter data (APD) for the target RUP, a second APD for the first PCP, and a third APD for the second PCP;
generate a first parameter graph set (PGS) comprising a first graphical representation for the target RUP based on the first APD, a second graphical representation for the first PCP based on the second APD, and a third graphical representation for the second PCP based on the third APD; and
populate a first portion of a user interface reserved for the first node using the first PGS.

17. The non-transitory CRM of claim 16, further comprising computer readable program code, which when executed by the computer processor, enables the computer processor to:
identify, for the target RUP, a set of other RUPs comprising at least one other RUP that is not the target RUP;
obtain, associated with the first node, a fourth APD for the target RUP, a fifth APD for the first PCP, a sixth APD for the second PCP, and a seventh APD for the at least one other RUP; and
compute a measure value between the target RUP and the at least one other RUP, using the fourth APD and the seventh APD.

18. The non-transitory CRM of claim 17, further comprising computer readable program code, which when executed by the computer processor, enables the computer processor to:
determine that the measure value satisfies a threshold measure value;
based on the determining:
append, to the set of PCPs, the at least one other RUP as a third PCP;

update the first PGS to obtain a second PGS comprising a fourth graphical representation for the target RUP based on the fourth APD, a fifth graphical representation for the first PCP based on the fifth APD, a sixth graphical representation for the second PCP based on the sixth APD, and a seventh graphical representation for the third PCP based on the seventh APD; and populate the first portion of the user interface reserved for the first node using the second PGS.

19. The non-transitory CRM of claim 17, further comprising computer readable program code, which when executed by the computer processor, enables the computer processor to:

determine that the measure value does not satisfy a threshold measure value;

based on the determining:
remove the first PCP from the set of PCPs, wherein the first PCP is the at least one other RUP;
update the first PGS to obtain a second PGS comprising a fourth graphical representation for the target RUP based on the fourth APD and a fifth graphical representation for the second PCP based on the sixth APD; and
populate the first portion of the user interface reserved for the first node using the second PGS.

20. The non-transitory CRM of claim 16, further comprising computer readable program code, which when executed by the computer processor, enables the computer processor to:

identify, from the set of nodes, a second node that exhibits the target RUP satisfying the PAC;

obtain, associated with the second node, a fourth APD for the target RUP, a fifth APD for the first PCP, and a sixth APD for the second PCP;

generate a second PGS comprising a fourth graphical representation for the target RUP based on the fourth APD, a fifth graphical representation for the first PCP based on the fifth APD, and a sixth graphical representation for the second PCP based on the sixth APD; and populate a second portion of the user interface reserved for the second node using the second PGS.

* * * * *